(12) United States Patent
Parrish et al.

(10) Patent No.: US 8,425,866 B2
(45) Date of Patent: *Apr. 23, 2013

(54) CONTROL OF EMISSIONS (75) Inventors: Clyde F. Parrish, Trinity, FL (US); Landy Chung, Jacksonville, FL (US)

(73) Assignee: The United States of America as Represented by the Administrator of the National Aeronautics and Space Administration, Washington, DC (US)

(*) Notice: Subject to any disclaimer, the term of this patent is extended or adjusted under 35 U.S.C. 154(b) by 1019 days.

This patent is subject to a terminal disclaimer.

(21) Appl. No.: 11/466,624

(22) Filed: Aug. 23, 2006

(65) Prior Publication Data

US 2008/0213148 A1  Sep. 4, 2008

Related U.S. Application Data (60) Provisional application No. 60/737,015, filed on Nov. 14, 2005.

(51) Int. Cl.
*B01D 53/56* (2006.01)

(52) U.S. Cl.
USPC ............................. 423/210; 423/235

(58) Field of Classification Search .............. 423/210, 423/235, 242.1, 243.01, 243.02, 243.11, 423/393, 394, 215.5, 477, 478
See application file for complete search history.

(56) References Cited

U.S. PATENT DOCUMENTS

| | | | |
|---|---|---|---|
| 3,322,497 A * | 5/1967 | Martin | 423/479 |
| 3,760,061 A * | 9/1973 | Hammond | 423/243.01 |
| 3,991,167 A | 11/1976 | Depommier et al. | |
| 4,110,183 A | 8/1978 | Furuta et al. | |
| 4,119,538 A | 10/1978 | Yamauchi | |
| 4,181,507 A * | 1/1980 | Nolden | 95/186 |
| 4,341,747 A | 7/1982 | Downey | |
| 4,514,366 A | 4/1985 | Barber | |
| 5,064,625 A | 11/1991 | Curtius | |
| 5,192,355 A | 3/1993 | Eastin | |
| 5,275,639 A | 1/1994 | Sullivan | |
| 5,328,673 A | 7/1994 | Kaczur et al. | |
| 5,345,033 A | 9/1994 | McLaughlin | |
| 5,362,319 A | 11/1994 | Johnson | |
| 5,397,549 A * | 3/1995 | Newman | 423/235 |
| 5,447,637 A | 9/1995 | Barber | |
| 5,514,352 A | 5/1996 | Hanna et al. | |
| 5,637,282 A | 6/1997 | Osborne et al. | |

(Continued)

FOREIGN PATENT DOCUMENTS

| | | |
|---|---|---|
| DE | EP 0 177 839 A2 | 9/1985 |
| EP | 0487834 A1 | 6/1992 |
| WO | WO 94/12429 A1 | 6/1994 |
| WO | WO 03/103810 A1 | 12/2003 |

OTHER PUBLICATIONS

Eckenfelder et al., Chemical Oxidation: Technologies for the Nineties, 1995, Technomic Publishing, p. 171).*

*Primary Examiner* — Melvin C Mayes
*Assistant Examiner* — Sheng H Davis
(74) *Attorney, Agent, or Firm* — Randall M. Heald; Jennifer P. Yancy (57) ABSTRACT

Methods and apparatus utilizing chlorine dioxide and hydrogen peroxide are useful to reduce NOx emissions, as well as SOx and mercury (or other heavy metal) emissions, from combustion flue gas streams.

31 Claims, 4 Drawing Sheets

U.S. PATENT DOCUMENTS

| | | |
|---|---|---|
| 5,639,434 A | 6/1997 | Patrikainen et al. |
| 6,039,783 A * | 3/2000 | Lueck et al. ................ 71/59 |
| 6,146,604 A | 11/2000 | Kiiskila et al. |
| 7,404,938 B2 | 7/2008 | Parrish |
| 2004/0175322 A1* | 9/2004 | Woodruff et al. ............ 423/478 |
| 2005/0008554 A1 | 1/2005 | Nowosielski-Slepowron et al. |
| 2005/0214187 A1 | 9/2005 | Johnson |
| 2006/0239877 A1 | 10/2006 | Johnson et al. |
| 2007/0237708 A1* | 10/2007 | Woodruff et al. ............ 423/478 |
| 2008/0241030 A1 | 10/2008 | Parrish et al. |

* cited by examiner

CONTROL OF EMISSIONS

CROSS-REFERENCE TO RELATED APPLICATIONS

This application claims the benefit under 35 U.S.C. 119(e) of U.S. Provisional Application Ser. No. 60/737,015 filed Nov. 14, 2005, the contents of which are incorporated herein by reference.

ORIGIN OF THE INVENTION

The invention described herein was made in part by an employee of the United States Government and may be manufactured and used by and for the Government of the United States for governmental purposes without the payment of any royalties thereon or therefor.

1. Field of the Invention

The present invention relates generally to emission control and in particular to the control of emissions from combustion sources.

2. Background of the Invention

Control of emissions from fossil fuel combustions sources addresses a major environmental problem. The Environmental Protection Agency (EPA) through the Clean Air Act regulates the emissions from fossil-fuel-fired power plants. Initial regulations were focused on oxides-of-nitrogen (NOx) and oxides-of-sulfur (SOx) emissions, but newer regulations will include provisions to control heavy metals (Hg, etc.) and carbon dioxide.

Gas streams from combustion processes are often scrubbed, i.e., contacted with water or water solutions, to remove many of their contaminants. However, these scrubbing processes often produce hazardous waste streams that must be dealt with. Furthermore, scrubbing of nitric oxide (NO) is generally ineffective. To remove this contaminant, the nitric oxide is typically converted to nitrogen dioxide ($NO_2$) prior to scrubbing. Various oxidizing agents have been utilized for this conversion. However, more effective oxidizing agents are also more unstable, may not be cost effective, and may be difficult or dangerous to store.

For the reasons stated above, and for other reasons stated below that will become apparent to those skilled in the art upon reading and understanding the present specification, there is a need in the art for alternative methods and apparatus for treating combustion gas streams.

SUMMARY OF THE INVENTION

Methods and apparatus utilizing chlorine dioxide ($ClO_2$) to reduce NOx emissions are described herein. Such methods and apparatus may be stand-alone systems or may further be incorporated into more encompassing systems, such as systems utilizing hydrogen peroxide to reduce SOx, NOx, and mercury or other oxides-of-metal emissions. The apparatus is modular and components can be added or removed depending upon the specific requirements for a given removal operation.

For one embodiment, the invention provides a method of treating a gas stream for removal of at least oxides of nitrogen. The method includes generating chlorine dioxide in a continuous reaction process, mixing the chlorine dioxide with the gas stream upon generation, maintaining a desired level of nitric oxide in the gas stream by regulating a generation rate of the chlorine dioxide, and scrubbing the gas stream with a hydrogen peroxide solution, thereby producing a first scrubber liquor. The method further includes maintaining a desired hydrogen peroxide concentration in the first scrubber liquor by regulating a flow of the first hydrogen peroxide solution.

For another embodiment, the invention provides a method of treating a gas stream for removal of at least oxides of sulfur and oxides of nitrogen. The method includes scrubbing the gas stream with a first hydrogen peroxide solution, thereby producing a first scrubber liquor, and maintaining a desired hydrogen peroxide concentration in the first scrubber liquor by regulating a flow of the first hydrogen peroxide solution. The method further includes removing a by-product stream containing sulfuric acid after attaining a desired sulfuric acid concentration in the first scrubber liquor. The method further includes a demister to reduce the transport of sulfuric acid mist. The method further includes oxidizing the gas stream using a chlorine dioxide mixture adapted to convert nitric oxide to nitrogen dioxide after scrubbing the gas stream with the first hydrogen peroxide solution and, after oxidizing the gas stream, scrubbing the gas stream with a second hydrogen peroxide solution. The method still further oxidizes elemental mercury to oxides-of-mercury with chloride dioxide and, after scrubbing the gas stream in a second hydrogen peroxide solution that contains nitric acid, dissolves the oxides-of-mercury.

For a further embodiment, the invention provides a system for the removal of at least oxides of nitrogen from a gas stream. The system includes an oxidation tower coupled to receive the gas stream and a chlorine dioxide mixture, a scrubber coupled to receive an exit gas stream from the oxidation tower and coupled to receive a hydrogen peroxide solution and a recycled liquor from the scrubber, a demister to reduce nitric acid mist, a neutralizer coupled to receive an exit gas stream from the scrubber that adjusts the pH to 7.0±2.0, and a chlorine dioxide generation and injection system for continuous generation of the chlorine dioxide mixture and injection into the oxidation tower.

For a still further embodiment, the invention provides a system for the removal of at least oxides of sulfur and oxides of nitrogen from a combustion flue gas. The system includes a heat exchanger to transfer heat from the a raw flue gas stream to the processed flue gas stream before it enters the flue exhaust stack, a water wash coupled to receive a raw flue gas stream as it exits from the heat exchanger, a first scrubber coupled to receive an exit gas stream from the water wash and coupled to receive a first hydrogen peroxide solution, a solids removal system coupled to receive a first scrubber liquor from the first scrubber and to provide a recycled scrubber liquor to the first scrubber after removal of solids from the first scrubber liquor, and a control system to maintain a desired hydrogen peroxide concentration in the recycled scrubber liquor and to maintain a desired sulfuric acid concentration in the recycled scrubber liquor. The system further includes a first demister coupled to receive an exit gas stream from the first scrubber, an oxidation tower coupled to receive an exit gas stream from the demister and a chlorine dioxide mixture, and a second scrubber coupled to receive an exit gas stream from the oxidation tower and coupled to receive a second hydrogen peroxide solution and a recycled liquor from the second scrubber. The system further includes a second demister coupled to receive an exit gas from the second scrubber. The system still further includes a neutralizer coupled to receive an exit gas stream from the second demister coupled to the second scrubber and a chlorine dioxide generation and injection system for continuous generation of the chlorine dioxide mixture and injection into the oxidation tower.

The invention further includes methods and apparatus of varying scope.

DETAILED DESCRIPTION OF THE INVENTION

In the following detailed description of the preferred embodiments, reference is made to the accompanying drawings that form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical, and chemical changes may be made without departing from the spirit and scope of the present invention. It is noted that the drawings are not to scale unless a scale is provided thereon. The following detailed description is, therefore, not to be taken in a limiting sense, and the scope of the present invention is defined only by the appended claims and equivalents thereof.

Emission control systems in accordance with the invention address environmental pollutants SOx, NOx, and heavy metals. Such systems are designed to control emissions of these environmental pollutants to the levels established by the EPA. This emission control system provides a method based on hydrogen peroxide to reduce the SOx, NOx, and metal and metal oxide emissions from combustion sources to acceptable levels as established by the EPA. In addition, useful by-product streams of sulfuric acid, nitric acid, salts of these acids, and feedstock for oxides-of-metal production may be isolated.

Figure 1:
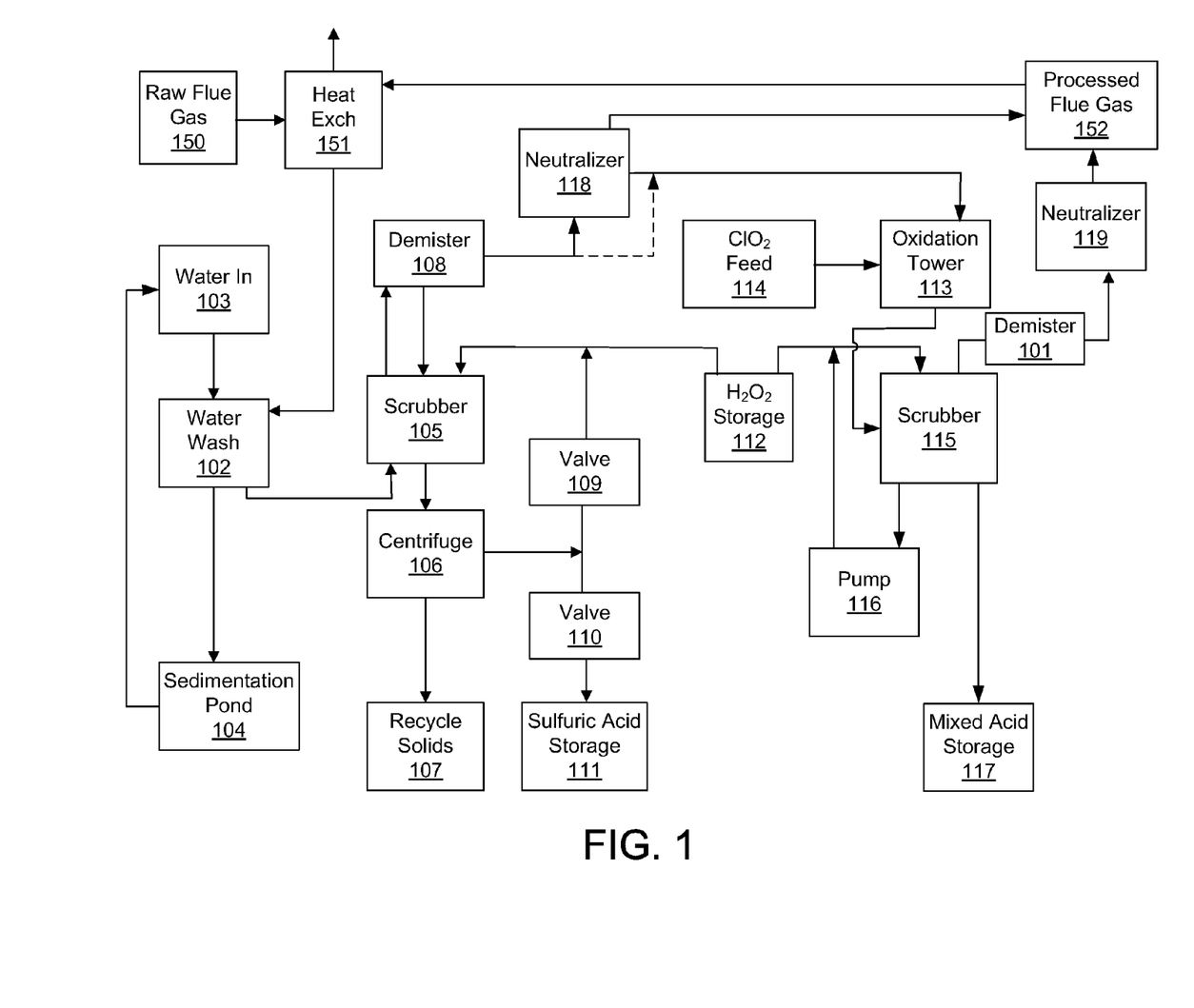
FIG. 1 is a block schematic of an emission control system in accordance with an embodiment of the invention.

FIG. 1 is a block schematic of an emission control system in accordance with an embodiment of the invention. The process starts with a gas stream, such as raw flue gas 150 after the particulates have been removed. There are several options for this design and steps can be omitted or alternate unit operations may be substituted for the general processes depending on the requirements of the installation. These alternate steps are noted during the description of the process.

The first step of the process is to use a cooling and wash chamber 102 to cool and remove some of the particulates in the entering flue gas 150. Process water from chamber 103 is provided to wash chamber 102. Particulates, wash water and heat are sent from chamber wash 102 to the sedimentation and cooling pond 104. Water is then re-circulated from pond 104 back to water chamber 103.

The washed flue gas is fed from wash chamber 102 to a scrubber tower 105 for the removal of SOx and/or heavy metals. Scrubber tower 105 uses hydrogen peroxide from hydrogen peroxide storage 112 to oxidize sulfurous acid ($H_2SO_3$) to sulfuric acid ($H_2SO_4$) to prevent reemission of $SO_2$. Hydrogen peroxide storage 112 preferably provides aqueous hydrogen peroxide of approximately 35 percent to 70 percent by volume, and more preferably at approximately 70 percent by volume. As the scrubber liquor pH decreases due to the formation of sulfuric acid, most of the heavy metal oxides, including Hg, etc., are dispersed as metal oxides and/or dissolved hydroxides are converted to sulfates. The remaining un-dissolved particulates and insoluble sulfates are removed with a solids removal system 106, e.g., a solid-bowl centrifuge, a continuous belt filter, or other system for the continuous removal of solids from a liquid stream. FIG. 1 depicts the use of a centrifuge 106 as the solids removal system as but one example.

Centrifuge 106 continuously removes the solids and circulates the scrubber liquor through valve 109 back to scrubber tower 105 for continuous scrubbing and cleaning the flue gas. When the scrubber liquor (sulfuric acid) reaches the desired concentration, the cleansed scrubber liquor is discharged from the centrifuge 106 through valve 110 then drained to sulfuric acid storage 111, which can then be utilized for fertilizer or industrial uses. The solids from centrifuge 106 are discharged to the recycle solids container 107. Soluble metals and metal oxides present in the cleansed scrubber liquor may further be removed as insoluble solids upon neutralization of the sulfuric acid as may be performed, for example, during the production of fertilizer.

The concentration of hydrogen peroxide in the first scrubbing mixture is maintained at a predetermined level, e.g., 0.1 to 5 percent by volume. Concentration of the first scrubbing mixture may be maintained using a hydrogen peroxide controller of the type described below. Additional detail of such a controller may be found in U.S. Pat. No. 6,039,783 issued Mar. 21, 2000, to Lueck, et al. and U.S. Pat. No. 6,641,638 issued Nov. 4, 2003, to Lueck, et al.

When the flue gas exits the scrubber tower 105 it contacts the demister 108, where the mist that contains sulfuric acid coalesces. The coalesced mist is returned to the scrubber tower 105 and the desulfurized flue gas flows to the neutralizer 118, if only the SOx system is used. If NOx is present, the neutralization is bypassed and the flue gas flows directly to the oxidation tower 113. Residual acid gases are neutralized with a base in neutralizer 118, the cleansed and neutralized flue gas passes through the heat exchanger, and then exits through the exhaust stack. Alternately, an exhaust fan could be used in place of the heat exchanger at the outlet of the neutralizer 118, if desired, to boost the cleansed and neutralized flue gas out of the exhaust stack as processed flue gas 152.

The analytical system used for the control system, as initially described in U.S. Pat. No. 6,039,783, contains a unique process that controls the concentration of hydrogen peroxide. The process is controlled by a programmable logic controller (PLC) designed to measure the concentration of hydrogen peroxide and to add additional hydrogen peroxide as required to maintain the preset concentration. In addition to the hydrogen peroxide controller, the control system contains two commercial controllers, one for pH and the other to measure the concentration of sulfuric acid, nitric acid, or salts of these acids. These commercial controllers are used to maintain a target pH or concentration and to add reagents as required. Details of the design and operation of the control system are given in the following section.

Figure 2:
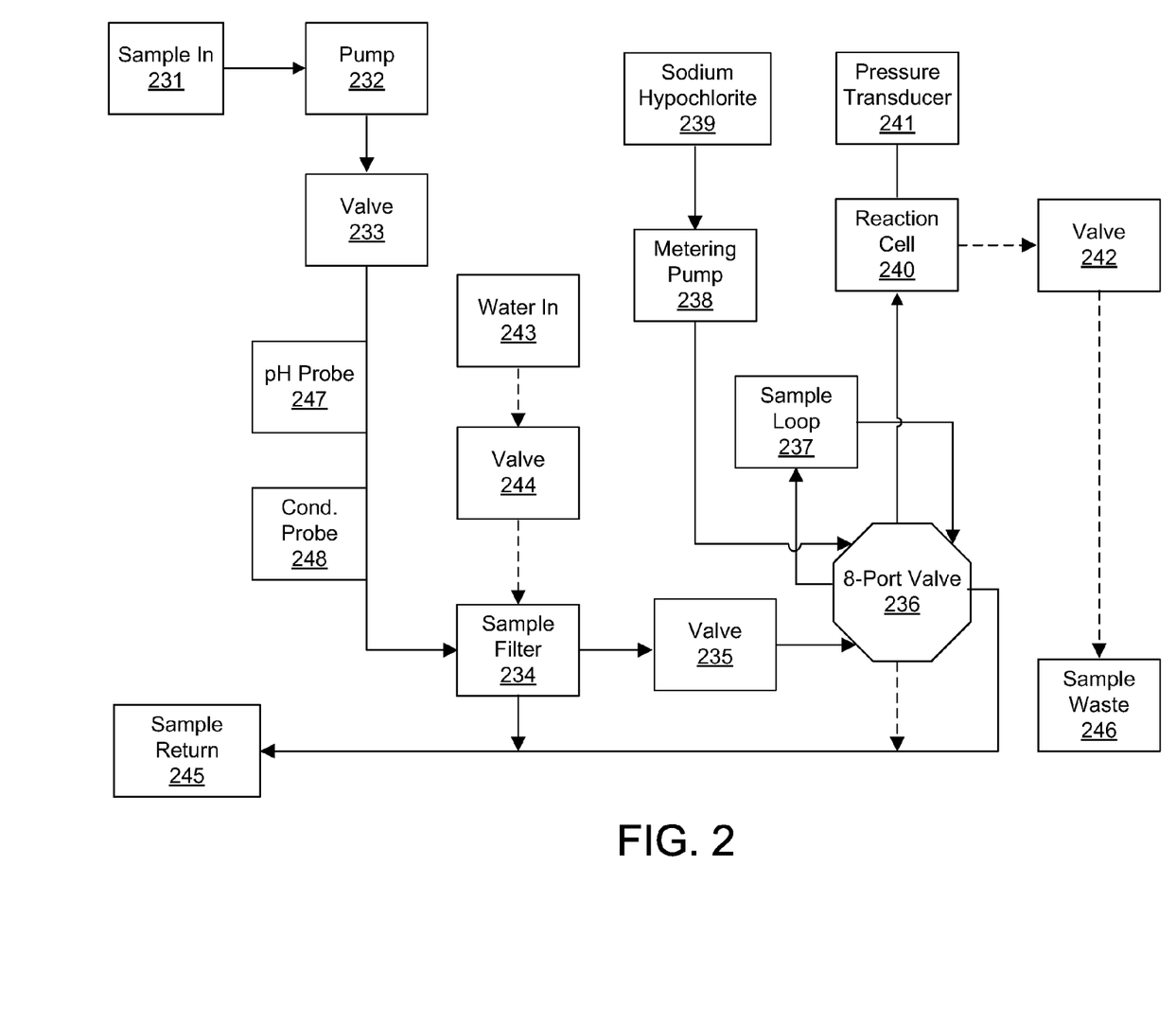
FIG. 2 is a schematic of a hydrogen peroxide concentration control system for use in accordance with one embodiment of the invention.

The block flow diagram for a hydrogen peroxide controller suited for use with embodiments of the invention is shown in FIG. 2. The hydrogen peroxide PLC that controls the operations starts the first sequence by pulling a sample into the system from sample point 231 with pump 232 and pumping it through valve 233. The pH probe 247 and conductivity probe 248 are exposed to the sample before passing the sample into metallic filter 234 where a portion of the sample passes through the filter 234 and the remainder bypasses the filter 234 and washes the residues back to sample return 245. The filtrate that passed through filter 234 continues through valve 235, multiport valve 236, and sample loop 237. From sample loop 237 the sample returns to multiport valve 236 and then exits and returns back to sample return 245. The sequence of events described above serves to collect a sample from the sample point 231, filter the sample, fill the sample loop that has a known volume, and return the unused sample to sample return 245. While the sample loop 237 is being filled, the metering pump 238 pulls sodium hypochlorite from container 239 and injects a known volume into reaction cell 240 through multiport valve 236. The second sequence is triggered by the PLC, which sends a signal to rotate multiport valve 236 and pump a second quantity of sodium hypochlorite, but this time it is used to displace the sample from the sample loop 237, which is pumped into the reaction cell 240. The reaction of sodium hypochlorite with hydrogen peroxide produces water, sodium chloride, and oxygen, which causes an increase in pressure in the reaction cell that is sensed by the pressure transducer 241. Calibration data programmed into the PLC for pressure change as a function of hydrogen peroxide concentration is used to control the concentration of hydrogen peroxide in the system. If the measured concentration is below the set concentration, a pump is activated to transfer hydrogen peroxide from storage. The hydrogen peroxide pump stops when the measured concentration is greater than the set concentration. This cycle is repeated continuously to maintain the set concentration of hydrogen peroxide. While the concentration is being measured, the filter 234 is back-flushed with water 243 through valve 244 to remove particulates captured by the filter 234. When the back-flush starts, valve 233 closes and pump 232 stops and the water 243 pushes through the filter 234 and back to the sample return 245. In addition, the contents of the reaction cell may be expelled through valve 242 to sample waste 246 at this time. Once the back-flush is complete, the PLC returns the process to the first sequence and sampling process start over again.

Figure 3:
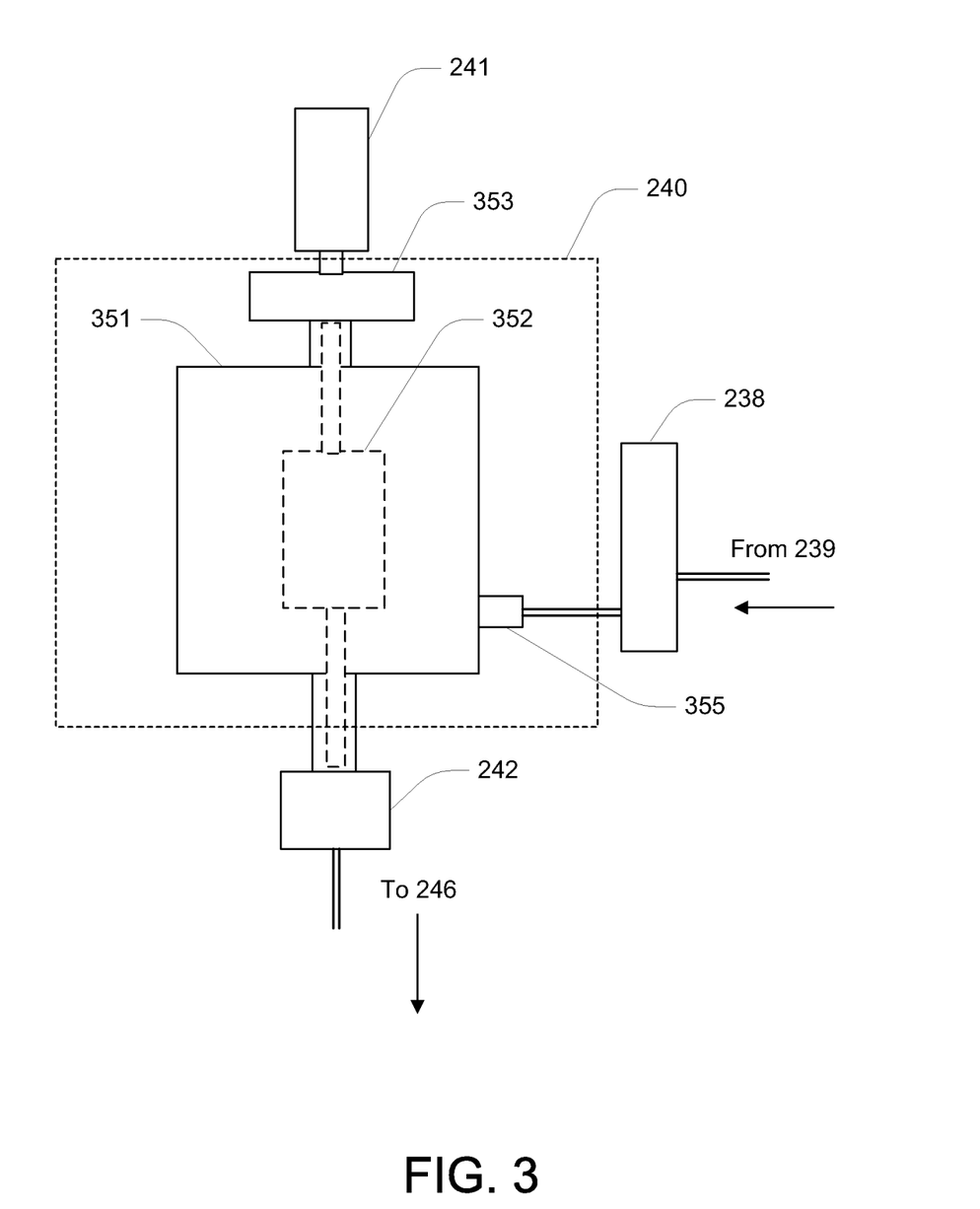
FIG. 3 is a hydrogen peroxide reaction vessel subsystem for use in accordance with one embodiment of the invention.

FIG. 3 shows the details of the reaction cell 240. The reaction cell body 351 has an internal chamber 352 that is attached to a gauge guard 353 that protects the pressure transducer 241. Sodium hypochlorite and the sample are pulled through sodium hypochlorite inlet 355 by metering pump 238. Once the reaction in the pressure cell is complete, it is discharged through valve 242 to sample waste 246. The reaction cell is fabricated preferably from a machinable corrosion-resistant polymer. While the foregoing brief description of the control of hydrogen peroxide concentration is included to aid the reader, a more detailed description is provided in U.S. Pat. Nos. 6,039,783 and 6,641,638 as noted previously.

The pH may be controlled with commercially-recognized devices, such as Rosemont's model 0054pH/ORP-08 pH controller and a model 306P-02010055 pH probe. The pH probe is item 247 in FIG. 2 and it is used to continuously measure the pH when the acid is neutralized to produce a fertilizer. The pH controller system has proportional algorithms that adjust the pump feed rate as the pH set-point is approached. For one embodiment, the pH is controlled to a level of between 7.0 and ±2.0 by adding a base, e.g., potassium hydroxide. The concentration of sulfuric acid and/or nitric acid, and salts of these acids, is controlled with the Rosemont model 1054B%1-99 controller. The conductivity probe model 228-02-21-54-61 is item 248 in FIG. 2. Once calibrated for the specific ion used in the system, the proportional control algorithms adjust pumping rate for the base used to form the salts.

Returning to FIG. 1, for removal of $NO_x$ emissions, the neutralized flue gas from neutralizer 118 flows to NO oxidation tower 113, where nitric oxide (NO) is oxidized to nitrogen dioxide ($NO_2$). Alternatively, the flue gas may be passed directly from the demister 108 to the NO oxidation tower 113 for later neutralization, eliminating neutralizer 118. Chlorine dioxide ($ClO_2$) from chlorine dioxide feed system 114 is fed into NO oxidation tower 113.

The chlorine dioxide fed to oxidation tower 113 reacts with NO to convert it to $NO_2$ and $HNO_3$ as follows:

Both the HCl and $HNO_3$ may be removed by subsequent scrubbing.

The oxidized NO in the flue gas flows from the oxidation tower 113 to the scrubber tower 115 where it is captured as nitric acid in an acidic hydrogen peroxide scrubber liquor generally as follows:

The concentration of hydrogen peroxide in the second scrubbing mixture ranges from 0.1 percent to 5 percent by volume and is controlled by a second hydrogen peroxide controller determining make-up hydrogen peroxide from the hydrogen peroxide storage 112 to add to the re-circulating scrubber liquor from pump 116. The cleansed flue gas exits from scrubber tower 115 passes into neutralizer 119, where base is added to neutralize any residual acid gases by adjusting the pH to 7. Once neutralized, the cleansed flue gas exits through the heat exchanger, and then to the exhaust stack as processed flue gas 152. Alternately, an exhaust fan could be used in place of the heat exchanger at the outlet of the neutralizer 119, if desired, to boost the cleansed and neutralized flue gas out of the exhaust stack as processed flue gas 152. The mixed acid solution containing nitric acid and hydrochloric acid is then sent to mixed acid storage 117 for recovery or disposal.

Although chlorine dioxide is recognized as an unstable gas, the various embodiments generate the chlorine dioxide gas at the time of use and, optionally, providing for concurrent dilution with air. Chlorine dioxide may be produced continuously by mixing a solution of hydrogen peroxide ($H_2O_2$) and sulfuric acid ($H_2SO_4$) with the solution of sodium chlorate ($NaClO_3$). The produced chlorine dioxide may be mixed, as it is formed, with air to keep the gas phase concentration below 10 percent.

Figure 4:
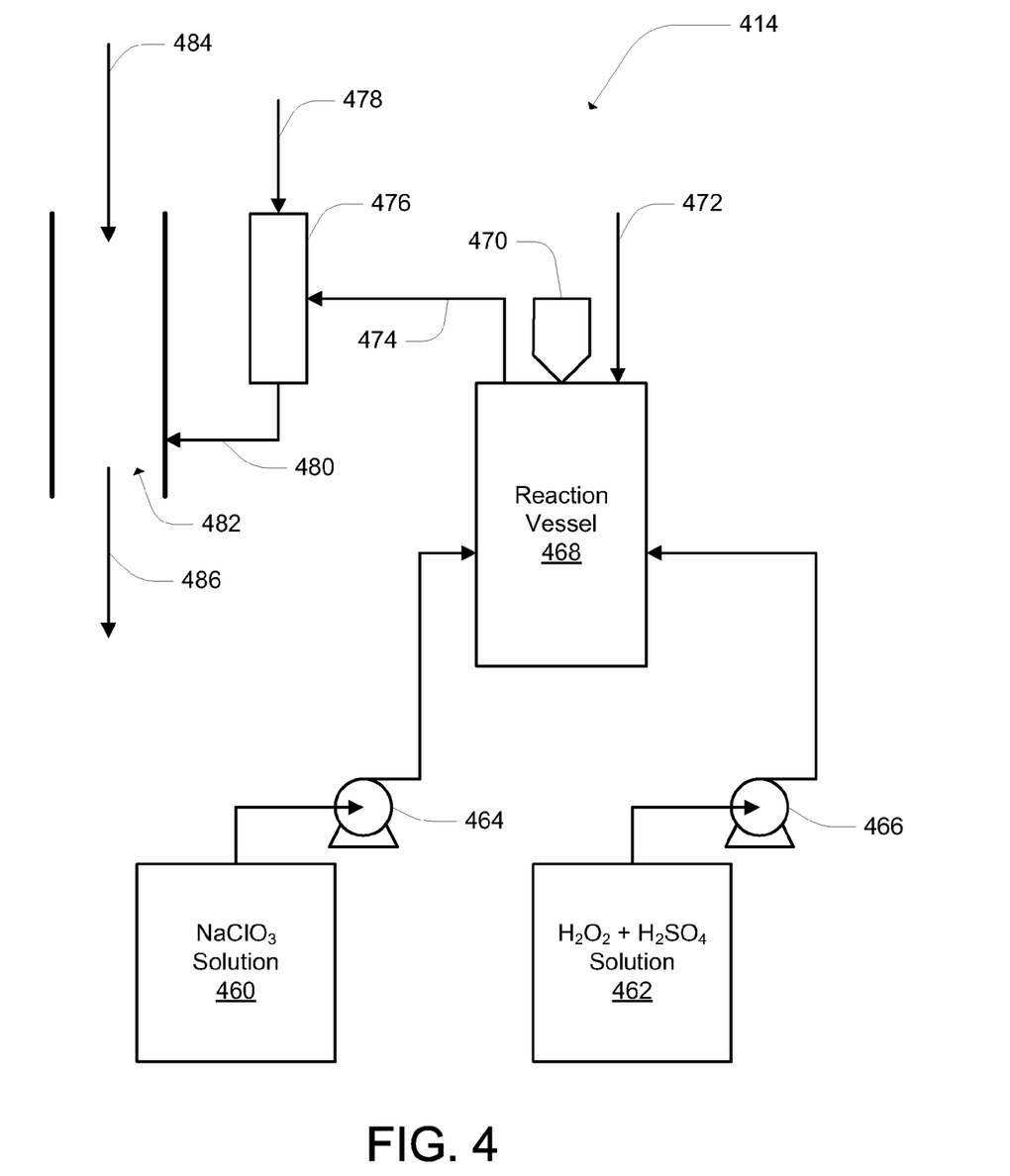
FIG. 4 is a functional schematic of a chlorine dioxide generation and injection system in accordance with an embodiment of the invention.

FIG. 4 is a functional schematic of a chlorine dioxide feed system 414 in accordance with an embodiment of the invention. The chlorine dioxide is generated through a reaction of a sodium chlorate solution 460 and a hydrogen peroxide and sulfuric acid solution 462. The sodium chlorate solution 460 is metered into a reaction vessel 468 using a metering pump 464. The hydrogen peroxide and sulfuric acid solution 462 is metered into the reaction vessel 468 using a metering pump 466.

For one embodiment, the hydrogen peroxide and sulfuric acid solution 462 is produced using 37.6 wt % of sulfuric acid (98 wt %) and 7 wt % of hydrogen peroxide (50 wt %) in water. The solution can be prepared by slowly adding sulfuric acid (98 wt-%) to water, allowing that to cool, and then adding hydrogen peroxide (50 wt-%). For a further embodiment, the sodium chlorate solution 460 contains 50 wt % sodium chlorate ($NaClO_3$) in water. A solution having a specific gravity of 1.4 may be prepared by mixing equal weights of $NaClO_3$ and water. The solution can be prepared by slowing adding sodium chlorate to water and stirring until the solids are dissolved.

The reaction vessel 468 is preferably of a material resistant to the oxidizing power of the reagents, e.g., glass-lined, polyethylene-lined, Teflon®-lined, etc., and equipped with a mixer 470. To initiate the reaction, it may be desirable to add crystalline sodium chlorate to some hydrogen peroxide and sulfuric acid solution 462 in the reaction vessel 468, and then meter in further hydrogen peroxide and sulfuric acid solution 462 and sodium chlorate solution 460 after the reaction has begun, e.g., after approximately a 5 minute delay. By metering in at approximately stoichiometric molar quantities of the reagents 460 and 462, a desired production rate of chlorine dioxide may be maintained.

For one embodiment, desired rate for production of chlorine dioxide is an amount sufficient to reduce NO emissions from a flue gas stream 484 to a desired level when mixed with the flue gas 484 as described below. The reaction of the reagent solutions 460 and 462 may proceed generally as follows:

$$2NaClO_3 + H_2SO_4 + H_2O_2 \rightarrow 2ClO_2 + O_2 + Na_2SO_4 + 2H_2O$$

Due to dilution as the reaction proceeds, the reaction vessel 468 may need to be drained occasionally for the removal of excess water and sodium sulfate ($Na_2SO_4$).

The reaction vessel may further include an air intake 472 to maintain the reaction vessel 468 at approximately ambient pressures and to provide an air sweep for dilution of the produced chlorine dioxide. For one embodiment the air intake 472 is passive and provides make-up air as a chlorine dioxide/air mixture 474 is pulled from head space of the reaction vessel 468 by an eductor 476. Alternatively, the air intake 472 may include regulated pressure feed to push the chlorine dioxide/air mixture 474 out of the reaction vessel 468. If air intake 474 is not passive, the eductor 476 may be eliminated. Note that while air is used in this example, an inert gas may also be substituted.

The eductor 476 is operated using a pressurized air feed 478, resulting in a further diluted chlorine dioxide/air mixture 480 for feed into flue 482. Note that the flue may represent the oxidation tower 113 of FIG. 1. In this example, the incoming flue gas 484 would represent the output of the neutralizer 118 or the demister 108 of FIG. 1, and the outgoing flue gas 486 would represent the output of the oxidation tower 113 fed to scrubber 115.

The particulate material in the SOx scrubber liquor is a mixture of fly-ash and insoluble sulfates that include mercury and other heavy metals. These solid materials are removed from the scrubber sump with a solids removal system, such as a continuous filter, centrifuge, or a combination of a continuous filter and a centrifuge. To further improve the separation efficiency, the scrubber sump can be divided into two compartments. The first compartment is designed to receive the scrubber liquor that is returning from the scrubber tower and the second compartment is designed to receive the cleansed scrubber liquor and the overflow from the first compartment. The scrubber pump draws the scrubber liquor from the middle of the second compartment and the continuous filter or centrifuge draws from the bottom of the first compartment. This two compartment configuration can facilitate maximizing the concentration of particulates going to the filter or centrifuge and minimizing the particulates going to the scrubber pump.

Methods and apparatus for controlling emissions have been described. Some methods utilize hydrogen peroxide to reduce SOx and mercury (or other oxides-of-metal) emissions prior to treatment to reduce NOx. For removal of NO, chlorine dioxide is generated continuously and fed into the gas stream to be treated. By utilizing methods and apparatus in accordance with the invention, combustion flue gas streams can be treated for the removal of NOx, as well as SOx and oxides-of-metal, while isolating useful by-products streams of nitric acid, sulfuric acid, salts of nitric acid, salts of sulfuric acid and solids for the recovery of the heavy metals. One of the significant advantages of the present invention is the fact that the process can be run continuously, with measuring and adjustments made in real time while the process is being performed. Computer monitoring can initiate flow changes of reagents in response to automatic measurements to maintain desired process conditions.

Although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of the present invention. Therefore, it is manifestly intended that this invention be limited only by the claims and the equivalents thereof.

What is claimed is:

1. A method of treating a gas stream for removal of at least oxides of nitrogen, the method comprising:
   a) oxidizing the gas stream in an oxidizer including:
      i) generating chlorine dioxide in a continuous reaction process;
      ii) diluting the chlorine dioxide with air or inert gas concurrent with generating the chlorine dioxide;
      iii) mixing the diluted chlorine dioxide with the gas stream upon generation into the oxidizer to convert nitric oxide to nitrogen dioxide; and
      iv) maintaining a desired level of nitric oxide in the gas stream by regulating a generation rate of the chlorine dioxide;
   b) after oxidizing the gas stream, scrubbing the gas stream in a scrubber including:
      i) reacting the gas stream with a hydrogen peroxide solution to convert nitrogen dioxide to nitric acid in an acidic hydrogen peroxide scrubber liquor, thereby producing a first scrubber liquor;
      ii) maintaining a desired hydrogen peroxide concentration in the first scrubber liquor by regulating a flow of the first hydrogen peroxide solution; and
      iii) removing a stream containing the nitric acid in the acidic hydrogen peroxide scrubber liquor from the scrubber.

2. The method of claim 1, wherein generating chlorine dioxide in a continuous reaction process comprises continuously adding a sodium chlorate solution and a hydrogen peroxide and sulfuric acid solution to a reaction vessel.

3. The method of claim 2, wherein mixing the diluted chlorine dioxide with the gas stream upon generation comprises removing the chlorine dioxide from the reaction vessel using an eductor.

4. The method of claim 3, wherein diluting the chlorine dioxide comprises passively adding make-up air to the reaction vessel to maintain the reaction vessel at ambient conditions.

5. The method of claim 2, wherein diluting the chlorine dioxide and mixing the diluted chlorine dioxide with the gas stream upon generation comprises removing the chlorine dioxide from the reaction vessel using an eductor while adding air or inert gas to the reaction vessel to maintain a gas phase concentration of less than 10 percent chlorine dioxide.

6. The method of claim 2, wherein mixing the diluted chlorine dioxide with the gas stream upon generation comprises pressuring the chlorine dioxide from the reaction vessel into the gas stream.

7. The method of claim 2, further comprising
adjusting a rate of addition of the sodium chlorate solution and a rate of addition of the hydrogen peroxide and sulfuric acid solution to regulate the generation rate of the chlorine dioxide.

8. The method of claim 1, wherein scrubbing the gas stream with the first hydrogen peroxide solution further comprises:
feeding the gas stream into a scrubber;
feeding the first hydrogen peroxide solution into the scrubber; and
recycling the first scrubber liquor into the scrubber with the first hydrogen peroxide solution.

9. The method of claim 8, further comprising:
sampling a mixture of the first hydrogen peroxide solution and the recycled first scrubber liquor for a level of hydrogen peroxide; and
controlling the level of hydrogen peroxide in the mixture to be at least a predetermine level of 0.1 percent to 5 percent by volume.

10. The method of claim 1, wherein dilution the chlorine dioxide comprises diluting the chlorine dioxide to a gas phase concentration of less than 10 percent chlorine dioxide.

11. The method of claim 1 further comprising:
c) neutralizing a cleansed gas that exits the scrubber by adding base to any residual acid gases forming a salt.

12. The method of claim 1 further comprising:
prior to oxidizing in step a), subjecting said gas stream to a cooling and wash chamber to cool and remove some of the particulates in the gas stream.

13. A method of treating a gas stream for removal of at least oxides of sulfur and oxides of nitrogen, the method comprising:
a) scrubbing the gas stream in a first scrubber to remove oxides of sulfur including:
 i) reacting oxides of sulfur in said gas stream with a first hydrogen peroxide solution to form sulfuric acid in the first scrubber, thereby producing a first scrubber liquor;
 ii) maintaining a desired hydrogen peroxide concentration in the first scrubber liquor by regulating a flow of the first hydrogen peroxide solution;
 iii) removing a by-product stream containing sulfuric acid from said first scrubber after attaining a desired sulfuric acid concentration in the first scrubber liquor;
b) after scrubbing in the first scrubber, oxidizing the oxides of nitrogen in the gas stream in an oxidizer including:
 i) generating chlorine dioxide and diluting the chlorine dioxide with air or inert gas to generate a chlorine dioxide mixture adapted to convert nitric oxide to nitrogen dioxide;
 ii) oxidizing the oxides of nitrogen in the gas stream using the chlorine dioxide mixture to convert nitric oxide to nitrogen dioxide;
c) after oxidizing the gas stream, scrubbing the gas stream in a second scrubber including:
 i) reacting the gas stream with a second hydrogen peroxide solution to convert nitrogen dioxide to nitric acid in an acidic hydrogen peroxide scrubber liquor; and
 ii) removing a stream containing the nitric acid in the acidic hydrogen peroxide scrubber liquor from said second scrubber.

14. The method of claim 13, wherein scrubbing the gas stream with the first hydrogen peroxide solution further comprises:
feeding the gas stream into a scrubber;
feeding the first hydrogen peroxide solution into the scrubber;
removing solids from the first scrubber liquor; and
recycling the first scrubber liquor into the scrubber with the first hydrogen peroxide solution.

15. The method of claim 14, further comprising:
sampling a mixture of the first hydrogen peroxide solution and the recycled first scrubber liquor for a level of hydrogen peroxide; and
controlling the level of hydrogen peroxide in the mixture to be at least a predetermined level.

16. The method of claim 15, wherein said predetermined level of 0.1 percent to 5 percent by volume.

17. The method of claim 14, wherein removing solids comprises centrifuging the resulting scrubber liquor.

18. The method of claim 13, wherein scrubbing the gas stream with the second hydrogen peroxide solution further comprises:
feeding the gas stream into a scrubber;
feeding the second hydrogen peroxide solution into the scrubber;
removing solids from a resulting second scrubber liquor; and
recycling the second scrubber liquor into the scrubber with the second hydrogen peroxide solution.

19. The method of claim 18, further comprising:
sampling a mixture of the second hydrogen peroxide solution and the recycled second scrubber liquor for a level of hydrogen peroxide; and
controlling the level of hydrogen peroxide in the mixture to be at least a predetermined level.

20. The method of claim 19, wherein the predetermined level of hydrogen peroxide is an amount necessary to provide a stoichiometric excess of hydrogen peroxide for reaction with the gas stream.

21. The method of claim 20, wherein said predetermined level 0.1 percent to 5 percent by volume.

22. The method of claim 13, wherein the chlorine dioxide mixture is generated in a continuous reaction process concurrently with oxidizing the gas stream using the chlorine dioxide mixture.

23. The method of claim 22, wherein the chlorine dioxide mixture is further generated in a process comprising continuously adding a sodium chlorate solution and a hydrogen peroxide and sulfuric acid solution to a reaction vessel.

24. The method of claim 23, wherein oxidizing the gas stream using the chlorine dioxide mixture comprises educting the chlorine dioxide mixture from the reaction vessel into the gas stream.

25. The method of claim 24, wherein diluting the chlorine dioxide comprises passively adding make-up air to the reaction vessel to maintain the reaction vessel at ambient conditions while educting the chlorine dioxide mixture from the reaction vessel.

26. The method of claim 23, wherein oxidizing the gas stream using the chlorine dioxide mixture comprises pressuring the chlorine dioxide from the reaction vessel into the gas stream.

27. The method of claim 23, further comprising:
adjusting a rate of addition of the sodium chlorate solution and a rate of addition of the hydrogen peroxide and sulfuric acid solution to regulate a generation rate of chlorine dioxide.

28. The method of claim 13, wherein diluting the chlorine dioxide comprises diluting the chlorine dioxide to a gas phase concentration of less than 10 percent chlorine dioxide.

29. The method of claim 13, wherein diluting the chlorine dioxide comprises adding air or inert gas to the reaction vessel to maintain a gas phase concentration of less than 10 percent while educting the chlorine dioxide mixture from the reaction vessel.

30. The method of claim 13, further comprising:
d) neutralizing a cleansed gas that exits said second scrubber by adding base to any Residual acid gases forming a salt.

31. The method of claim 13 further comprising:
prior to scrubbing the gas stream in the first scrubber in step a), subjecting said gas stream to a cooling and wash chamber to cool and remove some of the particulates in the gas stream.

\* \* \* \* \*